(12) United States Patent
Bhat et al.

(10) Patent No.: US 10,129,240 B2
(45) Date of Patent: *Nov. 13, 2018

(54) DISTRIBUTING SECURITY CODES THROUGH A RESTRICTED COMMUNICATIONS CHANNEL

(71) Applicant: AirWatch LLC, Atlanta, GA (US)

(72) Inventors: Manjunath Bhat, Bangalore (IN); Subhashish Pattajoshi, Bangalore (IN); Devdutt Rajaram, Bangalore (IN); Nithin Bhaktha, Bangalore (IN)

(73) Assignee: Airwatch LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,214

(22) Filed: Nov. 6, 2017

(65) Prior Publication Data
US 2018/0077148 A1    Mar. 15, 2018

Related U.S. Application Data

(63) Continuation of application No. 14/876,827, filed on Oct. 7, 2015, now Pat. No. 9,819,670.

(51) Int. Cl.
*H04L 29/06* (2006.01)
(52) U.S. Cl.
CPC ...... *H04L 63/0823* (2013.01); *H04L 63/0838* (2013.01); *H04L 63/0853* (2013.01); *H04L 2463/082* (2013.01)
(58) Field of Classification Search
CPC .................................................. H04L 63/0823
See application file for complete search history.

(56) References Cited

U.S. PATENT DOCUMENTS

| | | | |
|---|---|---|---|
| 7,257,583 B2 | 8/2007 | Hofmeister et al. | |
| 8,515,066 B2 | 8/2013 | Saito et al. | |
| 8,752,145 B1 | 6/2014 | Dotan et al. | |
| 8,763,089 B2 | 6/2014 | Qureshi et al. | |
| 9,009,476 B2 * | 4/2015 | Zhuang | G06Q 20/3563 713/168 |
| 9,036,820 B2 * | 5/2015 | Chastain | H04W 12/04 380/249 |
| 9,230,085 B1 | 1/2016 | Paczkowski et al. | |
| 9,232,341 B2 | 1/2016 | Fisher | |
| 9,703,572 B2 * | 7/2017 | Chen | G06F 9/4421 |

(Continued)

OTHER PUBLICATIONS

International Search Report dated Oct. 4, 2016 for PCT/US2016/039633.

(Continued)

*Primary Examiner* — Shawnchoy Rahman
(74) *Attorney, Agent, or Firm* — Thomas | Horstemeyer, LLP

(57) ABSTRACT

Disclosed are various examples for facilitating distribution of security codes for a two-factor authentication scheme or one-time passwords. Security codes can represent one-time passwords or shared secrets used to seed one-time password algorithms. The security codes can be sent through restricted communications channel to a client device. Rather than using an insecure communication link such as SMS for communication of security codes, the security codes can be sent through the restricted communications channel to reduce the possibility of leakage of the security codes.

20 Claims, 6 Drawing Sheets

(56) References Cited

U.S. PATENT DOCUMENTS

| | | |
|---|---|---|
| 9,866,546 B2* | 1/2018 | Brannon ............. H04L 63/0815 |
| 2004/0088576 A1 | 5/2004 | Foster et al. |
| 2007/0186106 A1 | 8/2007 | Ting et al. |
| 2007/0220271 A1 | 9/2007 | Law |
| 2008/0072060 A1 | 3/2008 | Cannon et al. |
| 2008/0301784 A1 | 12/2008 | Zhu et al. |
| 2011/0035768 A1 | 2/2011 | Ling et al. |
| 2011/0173681 A1 | 7/2011 | Qureshi et al. |
| 2012/0047425 A1 | 2/2012 | Ahmed |
| 2012/0079609 A1 | 3/2012 | Bender et al. |
| 2012/0102566 A1 | 4/2012 | Vrancken et al. |
| 2012/0117057 A1 | 5/2012 | Adimatyam et al. |
| 2012/0233537 A1 | 9/2012 | Kawabata |
| 2012/0254857 A1 | 10/2012 | Doraiswamy et al. |
| 2012/0304310 A1 | 11/2012 | Blaisdell |
| 2013/0078953 A1* | 3/2013 | Miller ............... H04M 1/72522 455/411 |
| 2013/0346753 A1 | 12/2013 | Boysen et al. |
| 2014/0007215 A1 | 1/2014 | Romano et al. |
| 2014/0007222 A1 | 1/2014 | Qureshi et al. |
| 2014/0281506 A1 | 9/2014 | Redberg et al. |
| 2014/0282610 A1 | 9/2014 | Strom et al. |
| 2015/0294515 A1 | 10/2015 | Bergdale et al. |
| 2015/0350179 A1 | 12/2015 | Kobayashi |
| 2016/0119354 A1 | 4/2016 | Logue et al. |
| 2016/0156598 A1 | 6/2016 | Alonso Cebrian et al. |
| 2016/0191249 A1 | 6/2016 | Panchapakesan et al. |

OTHER PUBLICATIONS

Office Action dated Feb. 9, 2017 for U.S. Appl. No. 14/753,889.
Notice of Allowance dated Aug. 14, 2017 for U.S. Appl. No. 14/753,889.

* cited by examiner

DISTRIBUTING SECURITY CODES THROUGH A RESTRICTED COMMUNICATIONS CHANNEL

CROSS-REFERENCE TO RELATED APPLICATIONS

This application is a continuation of and claims the benefit of U.S. patent application Ser. No. 14/876,827, filed Oct. 7, 2015 and entitled "DISTRIBUTING SECURITY CODES THROUGH A RESTRICTED COMMUNICATIONS CHANNEL," which is incorporated by reference herein in its entirety.

BACKGROUND

Authentication of users is important to maintain data security and access control. Many services employ two-factor authentication to improve security and reduce the chance of unauthorized access to data or services that are secured by authentication credentials. As one example, in order to access data or a service, a user can be required to provide a password along with a security code, such as a time-varying one-time password. In this way, to facilitate authentication of the user, the user is challenged to provide something the user knows, such as a password, along with something the user has in his or her possession, such as a device to which the security code is sent or one that generates the security code.

Some implementations of two-factor authentication involve generation of a one-time password by a server when a user presents his or her username and password. The server then transmits the one-time password to the user in an out-of-band communication, such as by email, short message service (SMS), instant messaging, or any other communication link that is different from that in which the user presented his or her username and password. Before granting access to the service or resource, the server also requires that the user also present the one-time password. However, a user's device can receive email, SMS messages, instant messages, or other forms of communications in an application that is insecure in some way.

For example, an application associated with a communication link can render some or all of a message that includes a security code on a lock screen of the smartphone. In this scenario, the contents of the message may be visible without requiring that the user present a device credential, such as personal identification number (PIN) or password. Additionally, should the device become lost or stolen, a server, in response to an authentication attempt on behalf of a user, may continue to send security codes to the lost or stolen device, which can result in the security codes being received by an unauthorized user.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
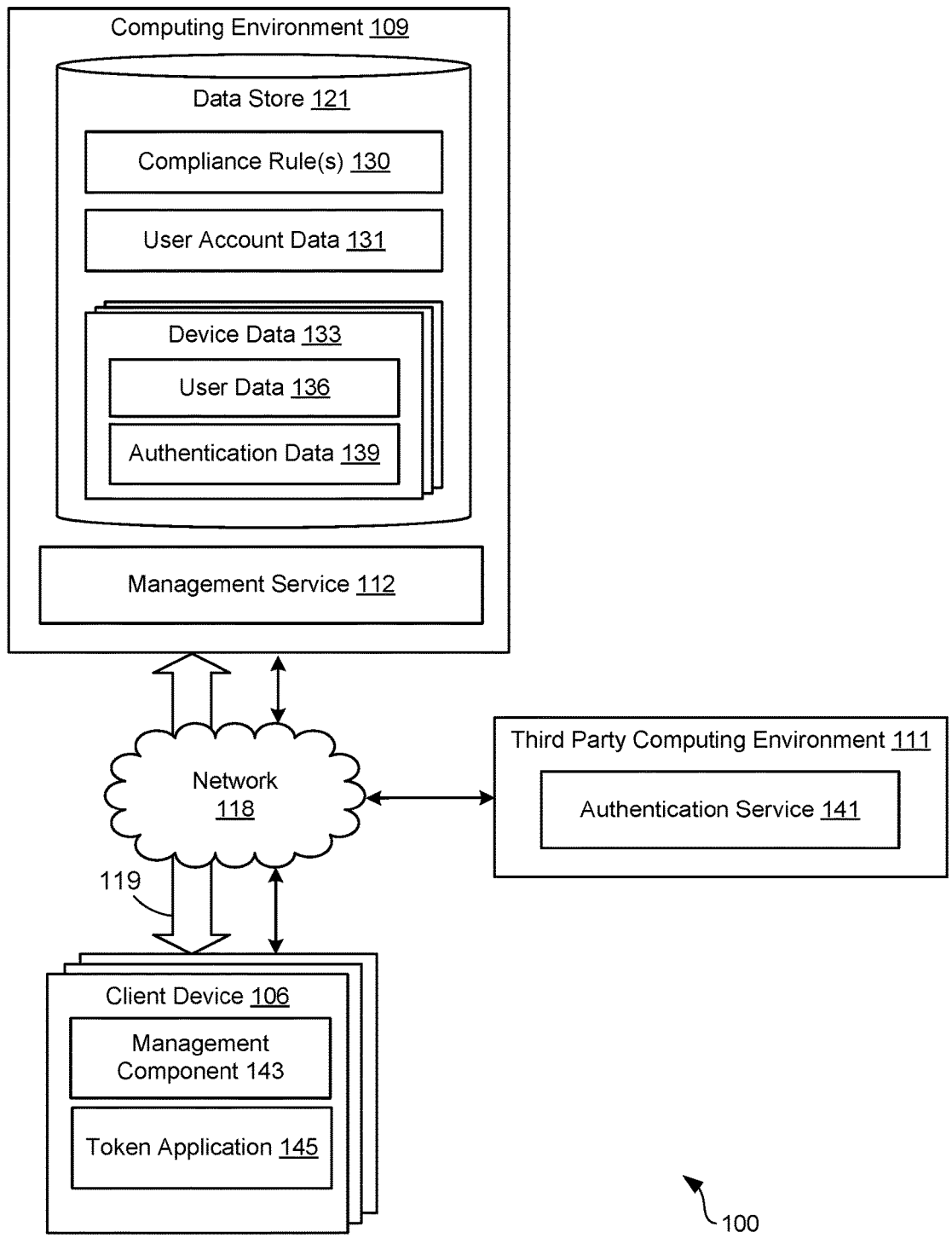
FIG. 1 is a drawing of a networked environment according to various examples of the disclosure.

Two-factor authentication is a security measure that is often employed to secure access to a resource or service. To implement two-factor authentication, a server that is handling an authentication request on behalf of a user or user account can require presentation of a username, password and an additional credential. The additional credential can include a one-time password. The one-time password can be generated using various one-time password algorithms. For example, the one-time password can be generated using a time-based one-time password (TOTP) algorithm where the one-time password is computed from a shared secret and the current time. The shared secret can include a passphrase, string, number, or any other seed value. As another example, the one-time password can also be generated using a keyed-hash message authentication code one-time password (HOTP) algorithm where the one-time password is computed from a shared secret and a counter.

The specific implementation of a two-factor authentication scheme can vary. In one implementation, a server handling an authentication request on behalf of a user account can generate a security code, such as a one-time password, on behalf of the user account and transmit the security code to the user by email, SMS, instant messaging, or any other communication link. In this scenario, the communication link is different from the communication link in which the user presents his or her username and password. For example, the user often presents his or her username and password in a web-based form or in an application user interface. Accordingly, the security code can be transmitted to the user using a communication link that is different from the communication link in which the user presents the username and password to the server. For example, a security code can be transmitted to the user in a SMS message. The user can then obtain the security code from the SMS message and provide the security code to the server handling an authentication request.

In another implementation of two-factor authentication, a server handling authentication request and a client device can be paired together so that a secret is shared between the server and the client device from which one-time passwords can be computed using a common one-time password algorithm. The secret can include a password, passphrase, numeric value, alphanumeric value, or any other value that can be used to seed a one-time password algorithm. Upon seeding the one-time password algorithm on the client device and server, the client device and server can independently calculate one-time passwords using a common one-time password algorithm. In this scenario, the server handling authentication requests can calculate a one-time password and the client device can independently calculate a one-time password that can be provided by the user or the client device in order to facilitate two-factor authentication.

Accordingly, security codes such as one-time passwords or shared secrets used to seed a one-time password algorithm that are sent to a client device over a communication link such as SMS, email, or other communication links can be considered insecure. For example, an operating system of a client device can render the contents of a received SMS message, email or instant message on a lock screen of the client device without requiring user authentication. Additionally, even if the client device does not render message contents on a lock screen of the client device without user authentication, gaining access to a user's SMS messages, email or instant messages can be possible if an attacker gains access to the user's device unlock PIN, which can be a numeric code that is less secure than a password. In some cases, a user of a client device may have disabled device security requiring a device unlock PIN in order to gain access to the client device. In these and in other scenarios, security codes can leak to unauthorized or malicious users due to the potentially insecure nature of SMS, email, or instant messaging, and the insecure fashion in which a client device may handle or render the contents of these forms of communication.

Accordingly, examples of this disclosure can facilitate the security of security codes that include one-time passwords and shared secrets used to seed one-time password algorithms that are obtained from a server by transmitting these security codes through a restricted communications channel that is encrypted or otherwise secured. One example of a restricted communications channel includes a mobile device management (MDM) channel.

With reference to FIG. 1, shown is a networked environment 100 according to various examples. The networked environment 100 includes a client device 106, a computing environment 109, and a third party computing environment 111, which can be in data communication with one another over the network 118. The network 118 includes, for example, the Internet, one or more intranets, extranets, wide area networks (WANs), local area networks (LANs), wired networks, wireless networks, other suitable networks, or any combination of two or more such networks. For example, the networks can include satellite networks, cable networks, Ethernet networks, and other types of networks.

The computing environment 109 and third party computing environment 111 can include, for example, a server computer or any other system providing computing capabilities. Alternatively, the computing environment 109 and third party computing environment 111 can employ multiple computing devices that can be arranged, for example, in one or more server banks, computer banks, or other arrangements. The computing devices can be located in a single installation or can be distributed among many different geographical locations. For example, the computing environment 109 and third party computing environment 111 can include multiple computing devices that together form a hosted computing resource, a grid computing resource, or any other distributed computing arrangement. In some cases, the computing environment 109 can operate as at least a portion of an elastic computing resource where the allotted capacity of processing, network, storage, or other computing-related resources can vary over time. The computing environment 109 and third party computing environment 111 can also include or be operated as one or more virtualized computer instances. Generally, the computing environment 109 and third party computing environment 111 can be operated in accordance with particular security protocols such that they are considered trusted computing environments. The data stored in the data store 121 is associated with the operation of the various components described below.

The computing environment 109 can execute a management service 112 or other systems. The management service 112 can manage or oversee the operation of multiple client devices 106. In some examples, an enterprise, such as one or more companies or other organizations, can operate the management service 112 to oversee or manage the operation of the client devices 106 of employees, contractors, or other users within an enterprise environment. In this sense, the client devices 106 are managed devices that are managed by the management service 112.

To facilitate management of client devices 106, the management service 112 can establish a restricted communications channel 119 with the client devices 106. The management service 112 can establish the restricted communications channel 119 by creating a secure communication link with the client device 106. A secure communication link can be established using MDM application programming interfaces (APIs) that are provided by an operating system executed by the client device 106. In some examples, the restricted communications channel 119 can be established using a push notifications framework or notification service provided by an operating system ecosystem associated with the client device 106. The restricted communications channel 119 can use a data connection, SMS channel, or other connection.

The client device 106 can be enrolled as a managed device with the management service 112 through APIs provided by the operating system. The enrollment process can include authentication of a user's credentials. Upon authentication of a user's credentials by the management service 112, the client device 106, using the MDM APIs of the operating system, can enroll the client device 106 as a managed device so that various management functions can be securely performed over the restricted communications channel 119.

Examples of management functions can include commands to erase certain data from the client device 106, commands to install certain applications or application updates, commands to lock a client device 106 or activate a display lock feature, a command to remotely perform a factory reset of the client device 106, or other management functions. Additionally, data can be securely transmitted through the restricted communications channel 119 to the client device 106 or applications executed by the client device 106.

Additionally, the operating system of the client device 106 can also provide the ability to create access-restricted storage that is associated with particular applications installed on the client device 106. Access-restricted storage can be associated with multiple applications that are installed on the client device 106 through the restricted communications channel 119. In some scenarios, applications that are signed by a common certificate can be provided access to the access-restricted storage of each other, whereas applications that are not signed by the certificate do not have access to the access-restricted storage of other applications. Additionally, the management service 112 can transmit data to the client device 106 over the restricted communications channel 119 that can be stored in the access-restricted storage such that it is accessible by certain applications and inaccessible to other applications that are installed on the client device 106.

The restricted communications channel 119 can be encrypted or secured using a digital certificate that is associated with the client device 106, the management service 112 or an enterprise with which the client device 106 is associated. In one scenario, the management service 112 can obtain a security certificate, such as a secure sockets layer (SSL) certificate, which is unique to a particular enterprise with which a client device 106 is associated. In one example, an administrator associated with the enterprise can provide a certificate to the management service 112 using an administrator console or other functionality with which a certificate can be uploaded. The certificate can also be signed by a certificate authority. The management service 112 can encrypt or secure the restricted communications channel 119 using the certificate so that the restricted communications channel 119 is a secure communication link over the network 118 through which data can be sent to the client device 106.

Additionally, the management service 112 can specify that data sent through the restricted communications channel 119 can only be accessed by certain applications installed on the client device 106. The applications that can access data sent through the restricted communications channel 119 can also be restricted in how certain data can be manipulated, viewed or handled on the client device 106. For example, an application installed on the client device 106 can be coded to restrict the ability of a user to capture, share, or otherwise remove data from the client device 106 that is received through the restricted communications channel 119.

In contrast, communication links involving short message service (SMS) messages, email, and other forms of communication can be prone to data leakage. For example, a SMS message sent to a client device 106 can be accessed by other applications installed on the client device 106 that have authority to access a SMS inbox of the client device 106. Additionally, a user of the client device 106 can have the ability to screen capture, copy, paste, forward, or otherwise capture and retransmit the contents of SMS messages. Email is also similarly prone to data leakage. A user can capture and retransmit the contents of email messages. Additionally, email messages are often accessible by devices other than the client device 106. These other devices may not be managed by the management service 112.

The management service 112 can also facilitate ensuring that client devices 106 that are administered by the management service 112 are operating in compliance with various compliance rules. In one scenario, the management service 112 can issue management commands that instruct a client device 106 to take a particular action with respect to a compliance rule. For example, if a client device 106 is designated as lost or stolen, the management service 112 can issue a command instructing the client device 106 to erase data and applications that were previously sent to the client device 106 through the restricted communications channel 119 or other communication links and otherwise stored on the client device 106. The management service 112 can also obtain data from a third party computing environment 111, such as an application, a security code, authentication token, or other data. As another example, if the management service 112 determines that a client device 106 has violated a compliance rule with respect to having unauthorized modifications or unauthorized applications installed on the client device 106, the management service 112 can issue a command instructing the client device 106 to erase data and applications from the client device 106. As a further example, the management service 112 can also issue a command instructing the client device 106 to activate a display lock of the client device 106 that requires a user to enter a PIN in order to use the client device 106. The management service 112 can also transmit data obtained from the third-party computing environment 111 or other sources to the client device 106 through the restricted communications channel 119.

The data stored in the data store 121 includes, for example, compliance rules 130, device data 133, and potentially other data. Within the context of an enterprise, compliance rules 130 include one or more rules that, when violated, can cause the management service 112 to issue a management command. Compliance rules 130 can include a list of unauthorized hardware functions, software functions, or applications that potentially pose a threat to enterprise data or to the use of enterprise applications. As noted above, if client device 106 falls out of compliance with one or more compliance rules 130, a management command can be transmitted to the client device 106 instructing the client device 106 to perform one or more actions specified by the compliance rule 130. Additionally, compliance rules 130 can also be stored on the client device 106 and enforced by the management component 143. The data store 121 can also include user account data 131. User account data 131 can include information with which a user account can be authenticated, such as user credentials. User account data 131 can also include data such as email, contact, calendar data, documents, files or other data that is associated with a user account.

Device data 133 can represent data stored in the data store 121 that is associated with client devices 106 that are enrolled with the management service 112 as managed devices. Device data 133 can include a unique device identifier associated with the client device 106, device policies that are associated with a particular client device 106, status information associated with a particular client device 106, and other data that facilitates management of the client device 106 by the management service 112. Device data 133 can also include user data 136. User data 136 represents user account data 131 that is synchronized with a particular client device 106. A user account can be associated with multiple client devices 106. Different client devices 106 associated with a user account can have different user account data 131 stored thereon. For example, a user's smartphone can have a certain number of documents or email messages stored on the device, whereas the user's laptop or tablet can have varying amounts of types of user account data 131 stored on the device.

Authentication data 139 represents data associated with authentication requests that are facilitated by the management service 112. An authentication request can be generated on behalf of a user attempting to access a resource through the management service 112 or any other service executed by the computing environment 109. An authentication request can also be associated with an attempt to access a service of a third party computing environment 111, such as a third party mail service, web service, or any other service for which authentication is required by a user. Authentication data 139 can represent data related authentication credentials of a particular user account. For example, a service can employ two-factor authentication in order to authenticate a user. In this scenario, the authentication data 139 can represent a password, passphrase, or other form of secret that is used to seed a one-time password algorithm. Authentication data 139 can also be housed by a third party computing environment 111 and provided to the management service 112 over the network 118.

The client device 106 is representative of one or more devices that may be associated with a user or enterprise that can be enrolled with the management service 112 as a managed device. As noted above, a restricted communications channel 119 can be established between the client device 106 and the management service 112 to facilitate secured and encrypted communications between the management service 112 and client device 106. The client device 106 can also execute an operating system that provides MDM APIs that facilitate creation of the restricted communications channel 119 and management of the client device 106 by the management service 112. For example, the MDM APIs provided by the operating system of the client device 106 can facilitate execution of commands generated by the management service 112 and sent to the client device 106 over the restricted communications channel 119.

The client device 106 can represent a processor-based system, such as a computer system, that may be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 106 can include a display that comprises, for example, one or more devices such as liquid crystal display (LCD) displays or other types of display devices. The client device 106 can also be equipped with networking capability or networking interfaces, including a localized networking or communication capability such as an NFC capability, RFID read and/or write capability, a microphone and/or speaker, or other localized communication capability.

The third party computing environment 111 can represent a computing environment that is external to the computing environment 109 in which the management service 112. The third party computing environment 111 can represent a computing environment that is operated by another entity other than an entity operating the management service 112. For example, the third party computing environment 111 can represent a computing system for a banking site, an external mail site, an electronic commerce site, or any other site or service in which a user may have an account and for which user authentication is desired. The third party computing environment 111 can execute an authentication service 141. The authentication service 141 can handle authentication requests on behalf of a user or user account. The third party computing environment 111 can also execute other servers, processes, or applications that facilitate functionality of a site or resource provided by the third party computing environment 111 but are not necessary for an understanding of examples of this disclosure.

The authentication service 141 can implement two-factor authentication that is facilitated by the management service 112. To this end, the authentication service 141 can generate a security code, such as a shared secret that is used to seed a one-time password algorithm. The security code can be transmitted to the management service 112 over the network 118. The management service 112 can transmit the security code to the client device 106 over the restricted communications channel 119. Upon receiving the security code, the client device 106 can compute one-time passwords according to the one-time password algorithm. The authentication service 141 can independently compute one-time passwords using the security code and a common one-time password algorithm to facilitate two-factor authentication. In another scenario, the authentication service 141 can generate a one-time password on behalf of a client device 106 and transmit the one-time password to the management server 112, which can forward the one-time password to the client device 106 through the restricted communications channel 119. In this scenario, the security code received by the client device 106 over the restricted communications channel 119 can be a one-time password rather than a shared secret from which one-time passwords are computed. In either scenario, the shared secret or one-time password is transmitted to the client device 119 through a secure restricted communications channel 119 rather than over an insecure communications link.

The client device 106 can be configured to execute various applications, such as a management component 143, a token application 145, and other applications, services, or processes. The management component 143 can monitor or manage at least a portion of the data, applications, or hardware components for the client device 106. The management component 143 can also identify whether the client device 106 is operating in accordance with the compliance rules 130 that have been assigned to the client device 106. In some examples, the management component 143 can function as a portion of an operating system for the client device 106. In other examples, the management component 143 can function in the application layer of the client device 106. Alternatively, the management component 143 can be a portion of an application that was developed, for example, using a Software Development Kit (SDK) that facilitates the inclusion of functionality within the application that monitors or manages at least a portion of the resources for the client device 106.

The management component 143 can be executed by the client device 106 automatically upon startup of the client device 106. Additionally, the management component 143 can run as a background process in the client device 106. Accordingly, the management component 143 can execute without user intervention in some examples. Additionally, the management component 143 can communicate with the management service 112 in order to facilitate management of the client device 106 and enforcement of compliance rules 130. For example, the management component 143 can obtain compliance rules 130 from the management service 112, and the management component 143 can determine whether the client device 106 is operating in accordance with those compliance rules 130. In another example, the management component 143 transmits data that indicates the status of the client device 106 to the management service 112, and the management service 112 uses this data to determine whether the client device 106 is operating in accordance with compliance rules 130. If it is determined that the client device 106 is not in compliance with one or more compliance rules 130, the management component 143 or the management service 112 can initiate a remedial action. The management component 143 can also execute commands to erase applications or data from the client device 106 that are received from the management service 112.

The token application 145 can implement the client side functionality of a two-factor authentication scheme. To this end, the token application 145 can generate or compute one-time passwords using a one-time password algorithm that is specified by the authentication service 141 or by the management service 112. The token application 145 can compute a one-time password using a shared secret that is transmitted to the token application 145 through the restricted communications channel 119. Alternatively, the token application 145 can receive one-time passwords generated by the authentication service 141 or management service 112 through the restricted communications channel 119.

In either scenario, the token application 145 can also render a one-time password on a display of the client device 106. The token application 145 can require that a user present a password or PIN in order to launch the token application 145 in order to view a one-time password using the token application 145. In this way, the token application 145 can provide an additional security layer for access to one-time passwords. The password required by the token application 145 can be different from a PIN that is used to unlock a display of the client device 106. One-time passwords can be stored by the token application 145 in an access-restricted storage of the client device 106 whereby access is restricted to only the token application 145 or other applications that are designated as having access to the access-restricted storage. Additionally, the token application 145 can be coded to prevent the rendering of one-time passwords on a display of the client device 106 when the display is locked.

The token application 145 can be a managed application that is managed by the management service 112. In this sense, a managed application includes an application that the management service 112 can remotely install or uninstall from the client device 106. One or more settings or preferences of a managed application can also be configured or dictated by the management service 112. The token application 145 can be distributed to the client device 106 through the restricted communications channel 119. The management service 112 can transmit a command to the management component 143 or the operating system of the client device 106 that instructs the client device 106 to install the token application 145, and to create an access-restricted storage area for the token application 145. Upon installation on the client device 106, the token application 145 can receive shared secrets or one-time passwords from the management service 112 through the restricted communications channel 119 and implement client-side functionality of a two-factor authentication scheme.

In one scenario, a user may wish to access a resource associated with a third-party computing environment 111 for which authentication is handled by the authentication service 141 using two-factor authentication. In the event that a two-factor authentication scheme implemented by the authentication service 141 requires that a user present a one-time password generated by the token application 145, the authentication service 141 can determine whether the user has established a pairing relationship between a client device 106 and the authentication service 141. If the user account has established a pairing relationship, the authentication service 141 can await presentation of a one-time password by the user. The authentication service 141 can independently calculate a one-time password from a shared secret using a common one-time password algorithm used by the token application 145. If the one-time password presented by the user matches the one-time password computed by the authentication service 141, the authentication service 141 can authenticate the user.

If no pairing relationship exists between a client device 106 and the authentication service 141 on behalf of the user, the authentication service 141 can establish the pairing relationship. To establish the pairing relationship, the authentication service 141 can transmit a security code, such as a shared secret, to the management server 112, which can forward the shared secret to the token application 145 through the restricted communications channel 119. The authentication service 141 can also transmit an indication of which one-time password algorithm the token application 145 should use in association with the authentication service 141.

In another scenario, rather than relying upon the token application 145 to compute a one-time password that is presented by the user, the authentication service 141 can employ a two-factor authentication scheme in which the authentication service 141 generates the one-time password according to a one-time password algorithm. The authentication service 141 can transmit the one-time password to the management service 112, which can forward the one-time password to the token application 145 through the restricted communications channel 119. If the one-time password presented by the user matches the one-time password computed by the authentication service 141 and sent to the token application 145 through the restricted communications channel 119, the authentication service 141 can authenticate the user. In either scenario, security codes in the form of shared secrets used to seed one-time password algorithms or one-time passwords themselves can be sent to the token application 145 through a secure restricted communications channel 119 rather than a communication link that is insecure.

Figure 2:
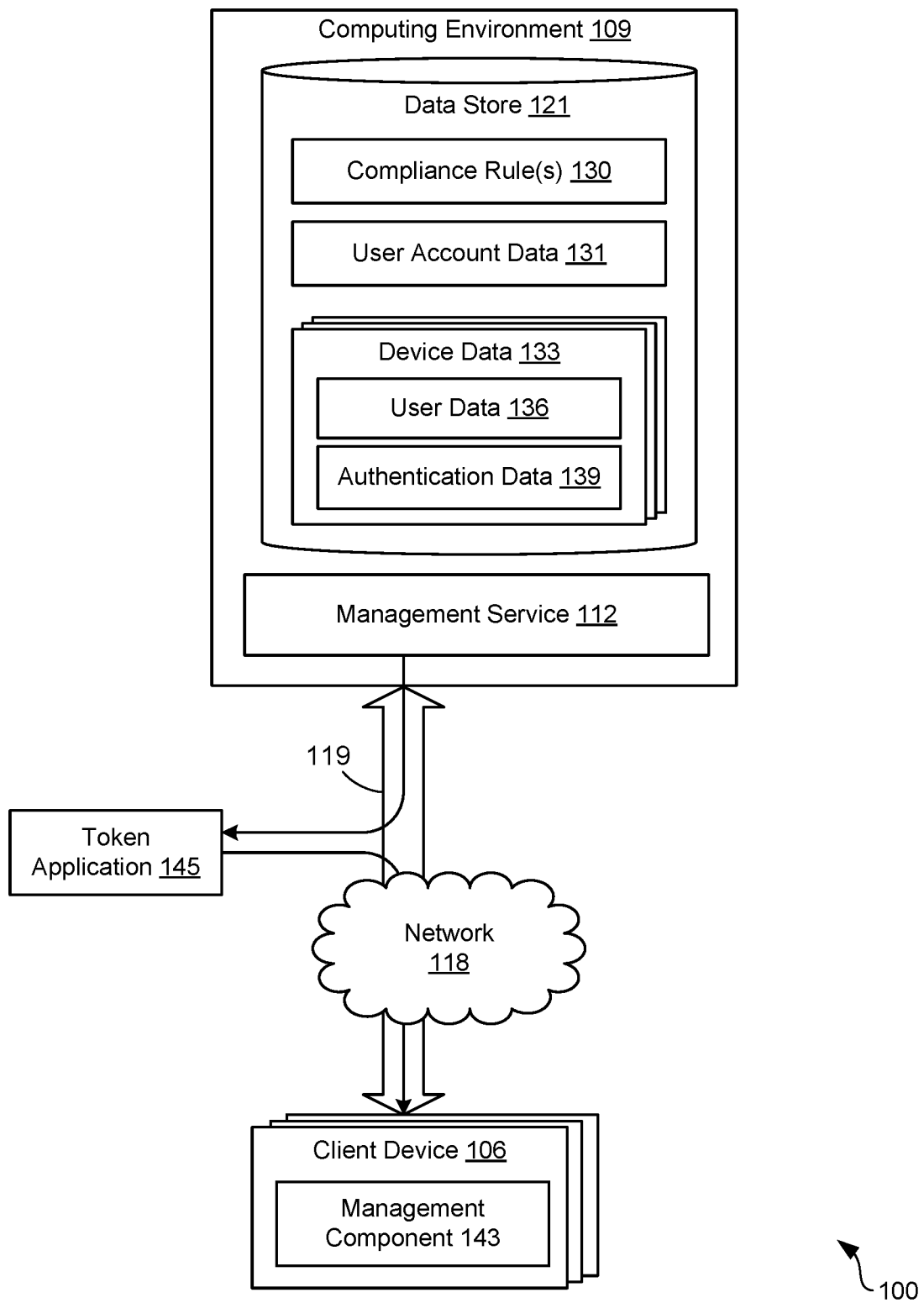
FIG. 2 is an alternative depiction of a networked environment according to various examples of the present disclosure.

Referring next to FIG. 2, shown is an alternative depiction of the networked environment 100 of FIG. 1. As shown in FIG. 2, the client device 106 is a managed device that is managed by the management service 112. Additionally, a secure restricted communications channel 119 has been established between the client device 106 and the management service 112 through which data can be transmitted. As shown in FIG. 2, the management service 112 can distribute the token application 145 through the restricted communications channel 119. The management service 112 can instruct the management component 143 or other processes running on the client device 106 to install the token application 145. In one example, the management service 112 can transmit a command to the client device 106 that instructs the client device to obtain the token application 145 from a public application distribution repository, such as an application store. The token application 145 can also be stored by the computing environment 109 and transmitted to the client device 106 through the restricted communications channel 119 by the management service 112.

In either scenario, the token application 145 can be configured as a managed application such that the management service 112 can initiate deletion of the token application 145 and any data stored by the token application 145, such as one-time passwords or shared secrets. Deletion of the token application 145 or any related data can be facilitated by MDM APIs provided by the operating system of the client device 106. The MDM APIs can allow a client device 106, once enrolled with the management service 112, to be managed by the management service 112. The management service 112 can then issue commands that are executed by the management component 143 or the operating system of the client device 106.

Figure 3:
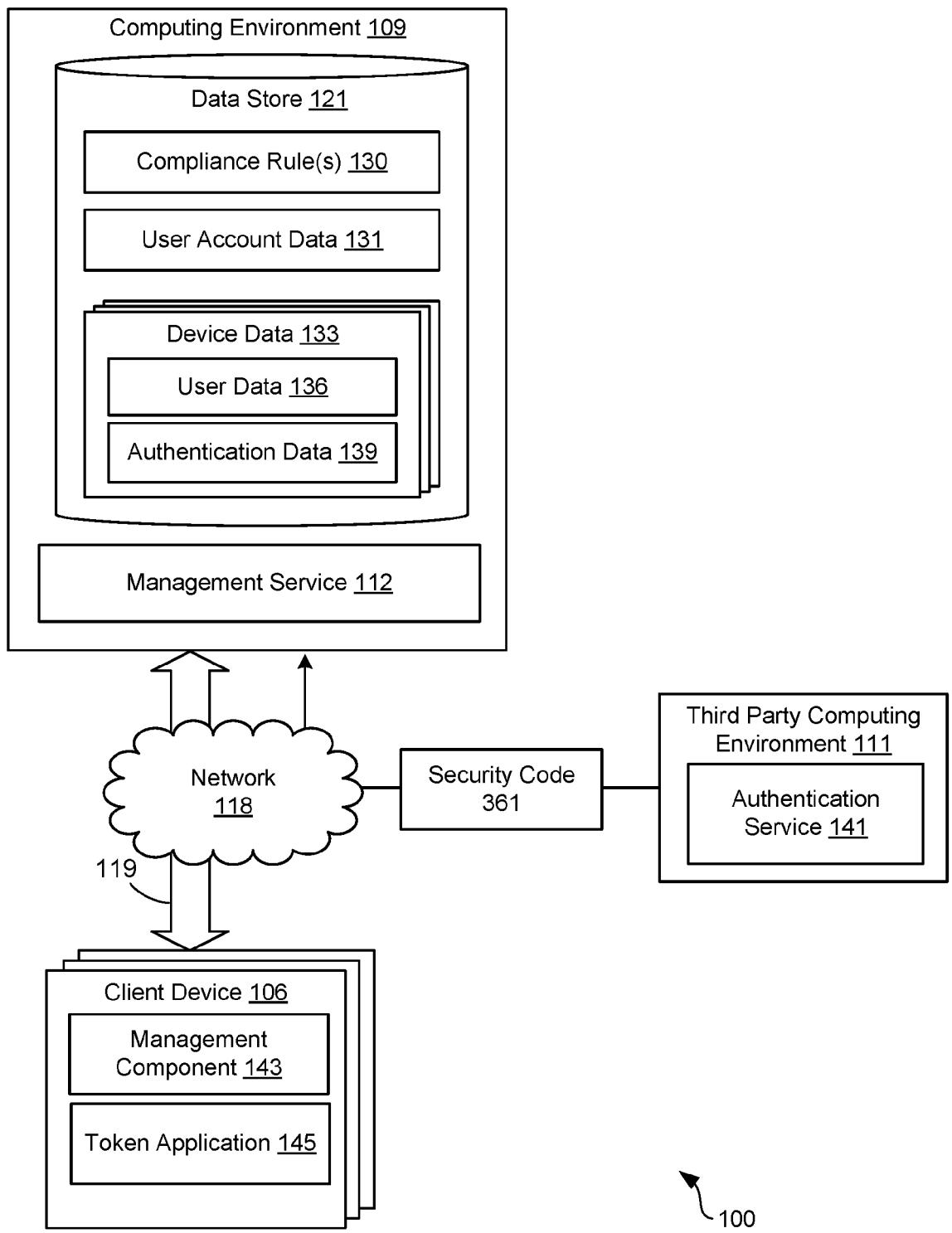
FIG. 3 is an alternative depiction of a networked environment according to various examples of the present disclosure.

Referring next to FIG. 3, shown is an alternative depiction of the networked environment 100. In FIG. 3, the token application 145 is installed on the client device 106 and the client device 106 is enrolled as a managed device with the management service 112. An authentication request can be generated on behalf of a user of the client device 106. An authentication request can include an attempt to access a user account associated with a service or resource provided by the third party computing environment 111. The authentication request can be handled by the authentication service 141. In one scenario, the authentication service 141 can generate a security code 361 that is transmitted to the management service 112 along with a request to forward the security code 361 to a client device 106 of the user that is paired with the authentication service 141. In one scenario, the security code 361 can include a one-time password generated by the authentication service 141.

In another scenario, the security code 361 can represent a shared secret that is used to seed a one-time password algorithm. In this scenario, the authentication service 141 can transmit the shared secret to the management service 112 along with a request to forward the shared secret to the token application 145 through the restricted communications channel 119. The authentication service 141 and the token application 145 can maintain the same shared secret so that they can independently compute the same one-time password using a common one-time password algorithm.

Figure 4:
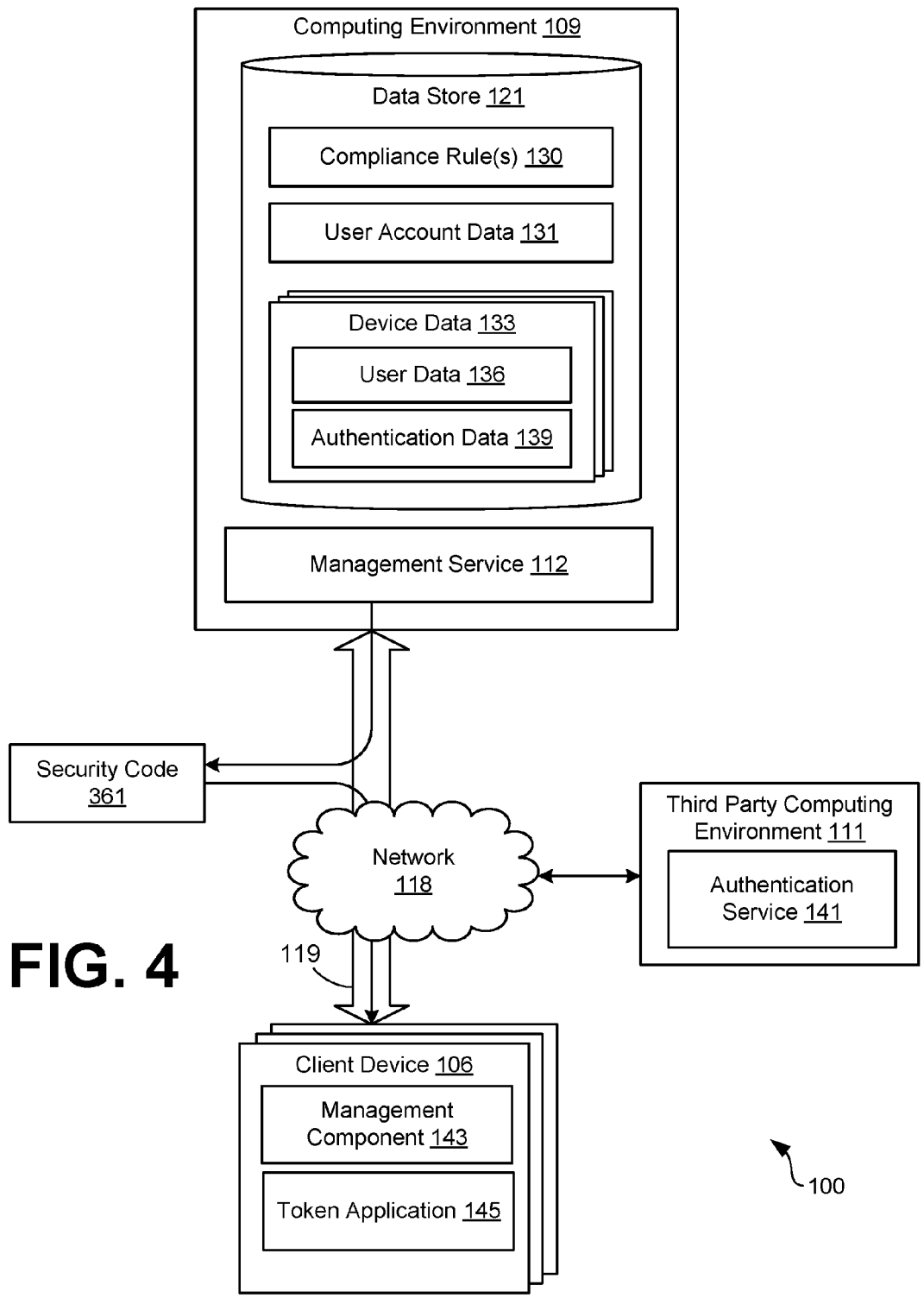
FIG. 4 is an alternative depiction of a networked environment according to various examples of the present disclosure.

Reference is now made to FIG. 4, which shows an alternative depiction of the network environment 100. As shown in FIG. 4, the management service 112 can forward the security code 361 to the token application 145 through the restricted communications channel 119. In this way, the security code 361 can be transmitted to the token application 145 through a secure restricted communications channel, such as a MDM channel, rather than through an unsecure communication link. In some examples of the disclosure, authentication requests can be handled by the management service 112 or another application executed by the computing environment 109 rather than by an authentication sever 141 executed by a third party computing environment 111. Accordingly, the management service 112, or another application executed by the computing environment 109, can also generate a security code 361 that is transmitted to the token application 145 through the restricted communications channel 119.

Figure 5:
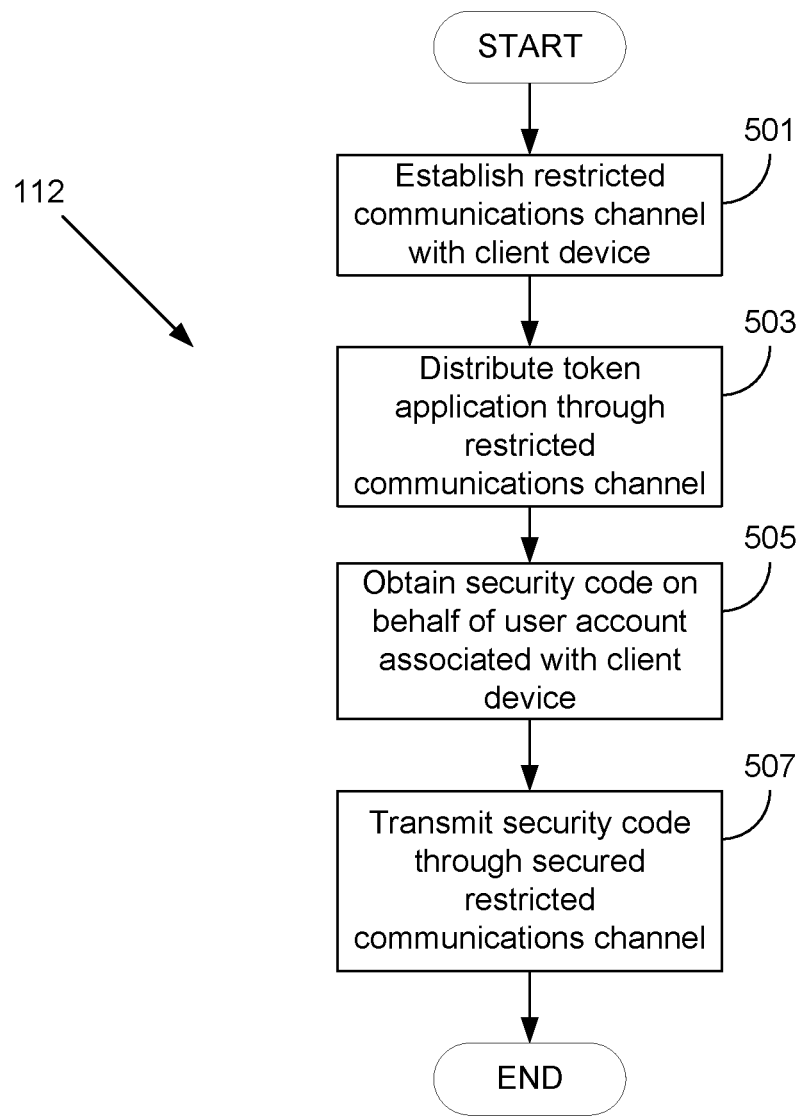
FIGS. 5-6 are flowcharts illustrating examples of functionality according to various examples of the present disclosure.

Referring next to FIG. 5, shown is a flowchart that provides one example of the operation of the management service 112. As an alternative, the flowchart of FIG. 5 can be viewed as depicting an example of elements of a method implemented in the computing environment 203 according to one or more examples. Functionality attributed to the management service 112 can be implemented in a single process or application executed by the computing environment 109 or in multiple processes or applications. The separation or segmentation of functionality as discussed herein is presented for illustrative purposes only.

Beginning with step 501, the management service 112 can establish a secure restricted communications channel 119 with a client device 106. The restricted communications channel 119 can be established by the management service 112 and secured using a SSL certificate, an encryption key, or any other security mechanism. The restricted communications channel 119 can also be secured with a certificate that is unique to an enterprise with which the client device 106 is associated. At step 503, the management service 112 can distribute the token application 145 to the client device 106 through the restricted communications channel 119.

At step 505, the management service 112 can obtain a security code associated with a request to authenticate a user associated with the client device 106. An authentication request can be linked with a user's attempt to access a resource or service provided by a third party computing environment 111 or the computing environment 109. The security code can include a shared secret that is used to seed a one-time password algorithm or a one-time password generated by the authentication service 141, management service 112, or other application handling the authentication request. At step 507, the management service 112 can transmit the security code to the token application 145 through the restricted communications channel 119. In this way, the security code can be provided to the token application 145 through a secure communication link. Additionally, because the token application 145 can be installed as a managed application on the client device 106, the management service 112 can issue a command to the client device 106 to erase the token application 145 from the client application 106 in the event that the device becomes compromised. A client device 106 can become compromised in the event that it is lost, stolen, or should an unauthorized user access gain access to data stored on the device.

In some examples, the token application 145 can include functionality that allows an administrator to invalidate tokens that are sent to or generated by the token application 145 should the client device 106 become compromised. The token application 145 can be generated using a software development kit (SDK) that incorporates security libraries that allow commands to be issued to the token applications 145 through the restricted communications channel 119. In some scenarios, the token application 145 can be generated through a process known as "wrapping." To wrap the token application 145, binary code associated with the token application 145 can be decompiled. The decompiled code can then be associated with an application wrapper that integrates security libraries into the decompiled code. Then, the decompiled code can be compiled and distributed to client devices 106 as the token application 145. Wrapping provides an alternative mechanism for integration of security functionality within the token application 145.

The security functionality integrated into the token application 145 can report status information to the management service 112 about whether the client device 106 has been compromised. For example, additional scenarios that may be linked with a compromised device can include the existence of unauthorized applications on the client device 106 or violation of a compliance rule. Upon detecting that the client device 106 has been compromised based upon the status data obtained from the token application 145, the management service 112 can transmit an indication that the client device 106 has been compromised to the authentication service 141. In response to receiving such an indication, the authentication service 141 can cease sending security codes 361 to the token application 145 or consider any security codes 361 generated by the token application 145 to be invalid. Accordingly, even if an unauthorized user gains access to a client device 106, any security codes 361 generated by the token application 145 will not be honored by the authentication service 141 in this scenario.

Figure 6:
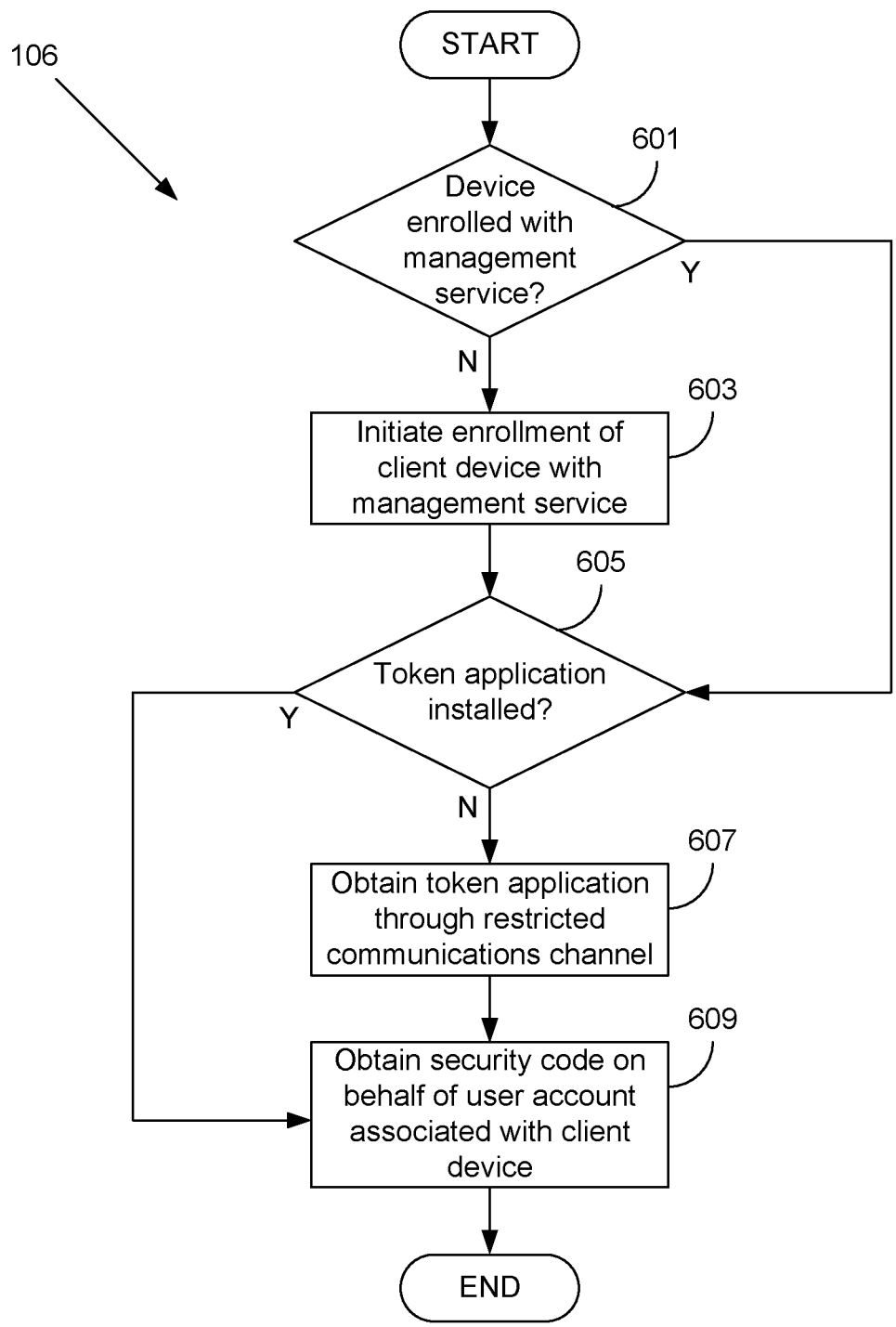

Referring next to FIG. 6, shown is a flowchart that provides one example of the operation of the client device 106. As an alternative, the flowchart of FIG. 6 may be viewed as depicting an example of elements of a method implemented in the client device 106 according to one or more examples.

Beginning with step 601, the client device 106 can determine whether the client device 106 is enrolled with the management service 112. If not, then at step 603, the client device 106 can initiate enrollment of the client device 106 with the management service 112. Enrollment of the client device 106 can cause the management service 112 to establish a restricted communications channel 119 between the client device 106 and the management service 112. If the client device 106 is already enrolled with the management service 112, the process can proceed directly to step 605.

At step 605, the client device 106 can determine whether the token application 145 is installed on the client device 106. If the token application 145 is not installed on the client device 106, then at step 607, the client device 106 can obtain the token application 145 through the restricted communications channel 119. For example, the management service 112 can transmit the token application 145 to the client device 106 through the restricted communications channel 119 or transmit an instruction to download and install the token application 145 from an application repository accessible through the network 118. If the token application 145 is installed on the client device 106, the process can proceed to step 609. At step 609, the client device 106 can obtain a security code for the token application 145 through the restricted communications channel 119. The token application 145 can suppress display of the token from a locked screen, avoiding the situation where a SMS containing a token is displayed to unauthorized users. Thereafter, the process can proceed to completion.

The flowcharts of FIGS. 5-6 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 106, computing environment 109, third party computing environment 111, or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the management service 112, the management component 143, token application 145 and/or other components can be stored in one or more storage devices and be executable by one or more processors. Also, a data store, such as the data store 121 can be stored in the one or more storage devices.

The management service 112, the management component 143, token application 145, or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying a program executable in a computing device, the program, when executed by the computing device, being configured to cause the computing device to at least:
   initiate enrollment of a client device associated with a user as a managed device with a management service through at least one mobile device management (MDM) application programming interface (API) provided by an operating system of the client device, wherein enrollment comprises authenticating at least one user credential of the user;
   cause a management component to be installed on the client device;
   establish a restricted communications channel between the computing device and the management component, wherein the restricted communications channel is encrypted using a certificate, the restricted communications channel further comprising an MDM channel established using the MDM API provided by the operating system of the client device;
   transmit, through the restricted communications channel, a command causing the client device to install a token application;
   cause the client device to install the token application on the client device;
   generate a security code on behalf of a user account in response to a request to authenticate the user account, wherein the security code is associated with a one-time password protocol; and
   transmit the security code to the token application through the restricted communications channel.

2. The non-transitory computer-readable medium of claim 1, wherein the security code comprises a shared secret associated with a one-time password algorithm, and wherein the shared secret seeds the one-time password algorithm.

3. The non-transitory computer-readable medium of claim 2, wherein the one-time password algorithm comprises a time-based one-time password algorithm (TOTP) or a keyed-hash message authentication code based one-time password algorithm (HOTP).

4. The non-transitory computer-readable medium of claim 1, wherein the security code comprises a one-time password generated using a one-time password algorithm.

5. The non-transitory computer-readable medium of claim 4, wherein the one-time password is generated by a third-party service, the one-time password being associated with an authentication attempt on behalf of the client device.

6. The non-transitory computer-readable medium of claim 1, wherein the program, when executed by the computing device, is further configured to cause the computing device to at least:
generate a command to remove the token application from the client device; and
transmit the command to the client device through the restricted communications channel to the management component, wherein the management component initiates removal of the token application from the client device.

7. The non-transitory computer-readable medium of claim 1, wherein the request to authenticate the user account is associated with a request to access data associated with the enterprise and the user account.

8. A system, comprising:
at least one computing device;
a management service executable by the at least one computing device, the management service configured to cause the at least one computing device to at least:
initiate enrollment of a client device associated with a user as a managed device with a management service through at least one mobile device management (MDM) application programming interface (API) provided by an operating system of the client device, wherein enrollment comprises authenticating at least one user credential of the user;
cause a management component to be installed on the client device;
establish a restricted communications channel between the at least one computing device and the management component, wherein the restricted communications channel comprises an encrypted communications channel, and the restricted communications channel further comprises an MDM channel established using the MDM API provided by the operating system of the client device;
transmit, through the restricted communications channel, a command instructing the client device to download a token application to the management component;
cause the client device to install the token application on the client device;
generate a security code on behalf of a user account in response to a request to authenticate the user account, wherein the security code is associated with a one-time password protocol; and
transmit the security code to the token application through the restricted communications channel.

9. The system of claim 8, wherein the management service establishes the restricted communications channel upon enrollment of the client device with the management service.

10. The system of claim 8, wherein the restricted communications channel is established with a notification service associated with an operating system executed by the client device.

11. The system of claim 8, wherein the security code comprises a one-time password generated using a one-time password algorithm.

12. The system of claim 8, wherein the security code comprises a shared secret that seeds a one-time password algorithm.

13. The system of claim 8, wherein the management service is further configured to cause the at least one computing device to at least:
generate a command to remove the token application from the client device; and
transmit the command to the client device through the MDM channel, wherein the command includes a call to the MDM API that causes the client device to erase data pertaining to the token application from the client device.

14. A method, comprising:
initiating enrollment of a client device associated with a user as a managed device with a management service through at least one mobile device management (MDM) application programming interface (API) provided by an operating system of the client device, wherein enrollment comprises authenticating at least one user credential of the user;
causing a management component to be installed on the client device;
establishing a restricted communications channel with the client device, the restricted communications channel comprising an encrypted communications channel, the restricted communications channel further comprising an MDM channel established using the MDM API provided by the operating system of the client device;
transmitting, through the restricted communications channel, a command instructing the management component to download a token application to the client device;
causing the client device to install the token application on the client device;
generating a security code on behalf of a user account in response to a request to authenticate the user account, wherein the security code is associated with a one-time password protocol; and
transmitting the security code to the token application through the restricted communications channel.

15. The method of claim 14, wherein generating the security code is performed upon authentication of the user with a credential associated with an enterprise.

16. The method of claim 15, wherein the credential associated with the enterprise is different from a personal identification code that unlocks a display of the client device.

17. The method of claim 14, further comprising:
generating a command to remove the token application from the client device; and
causing the management component to erase the token application and data associated with the token application from the client device.

18. The method of claim 14, wherein data associated with the token application is stored in an access-restricted storage of the client device, the access-restricted storage of the client device being inaccessible by a plurality of other applications installed on the client device.

19. The method of claim 14, wherein the security code comprises a one-time password generated using a one-time password algorithm.

20. The method of claim 14, wherein the security code comprises a shared secret that seeds a one-time password algorithm.

\* \* \* \* \*